United States Patent
Shibata et al.

(10) Patent No.: US 7,190,134 B2
(45) Date of Patent: Mar. 13, 2007

(54) TORSIONAL VIBRATION SUPPRESSING METHOD AND APPARATUS IN ELECTRIC MOTOR SPEED CONTROL SYSTEM

(75) Inventors: Naotake Shibata, Fukuoka (JP); Keisuke Sonoda, Fukuoka (JP); Masao Ikeguchi, Fukuoka (JP); Hirotaka Toujinbara, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/537,054

(22) PCT Filed: Nov. 25, 2003

(86) PCT No.: PCT/JP03/15024

§ 371 (c)(1),
(2), (4) Date: Jun. 2, 2005

(87) PCT Pub. No.: WO2004/051838

PCT Pub. Date: Jun. 17, 2004

(65) Prior Publication Data

US 2006/0061317 A1   Mar. 23, 2006

(30) Foreign Application Priority Data

Dec. 2, 2002 (JP) ............................. 2002-349879

(51) Int. Cl.
*H02P 7/00* (2006.01)
(52) U.S. Cl. ..................... 318/432; 318/254; 318/138; 318/435

(58) Field of Classification Search ................ 318/432, 318/254, 138, 439, 808, 460; 73/650, 601
See application file for complete search history.

(56) References Cited

U.S. PATENT DOCUMENTS 5,545,957 A * 8/1996 Kubo et al. ................. 318/432

FOREIGN PATENT DOCUMENTS

| JP | 8-168281 A | 6/1996 |
| JP | 9-121580 A | 5/1997 |
| JP | 3173007 B2 | 6/2001 |

* cited by examiner

*Primary Examiner*—Karen Masih
(74) *Attorney, Agent, or Firm*—Sughrue Mion, PLLC (57) ABSTRACT

It is an object of the invention to provide a torsional vibration suppressing apparatus further including an inertia control portion capable of suppressing a feeble vibration in a torsional vibration suppressing control portion.

The invention includes inertia control means (29) for calculating and outputting an inertia control signal $T_{MJC}$ from an electric motor acceleration torque signal $T_{MAFB}$ obtained by multiplying a signal acquired by differentiating an electric motor mean speed signal $N_{MAVG}$ by an inertia time constant $\tau_M$ of the electric motor portion, electric motor acceleration torque control means (28) for calculating a torque command compensation signal $T_{RFL}$ from a deviation signal of a signal $T_{RFAX}$ obtained by decreasing $T_{MJC}$ from a torque command signal $T_{RFA}$ and the electric motor acceleration torque signal $T_{MAFB}$, and electric motor torque control means for controlling a current of the electric motor in order to obtain an electric motor torque in accordance with a torque command $T_{RFM}$ to be a sum of $T_{RFA}$ and $T_{RFL}$.

3 Claims, 6 Drawing Sheets

TORSIONAL VIBRATION SUPPRESSING METHOD AND APPARATUS IN ELECTRIC MOTOR SPEED CONTROL SYSTEM

TECHNICAL FIELD

The present invention relates to the suppression of a resonance in a driving system to be a 2-inertia system or a multi-inertia system which has a resonant system, and more particularly to a method of suppressing the vibration of an electric motor which is improved to obtain a sufficient suppressing effect for a feeble vibration caused by the pulsating torque of the electric motor or a periodic fluctuation in a load, and a control apparatus.

BACKGROUND ART

Examples of a conventional vibration suppressing method include "a method of suppressing a torsional vibration in an electric motor speed control system" disclosed in Patent Document 1.

Figure 4:
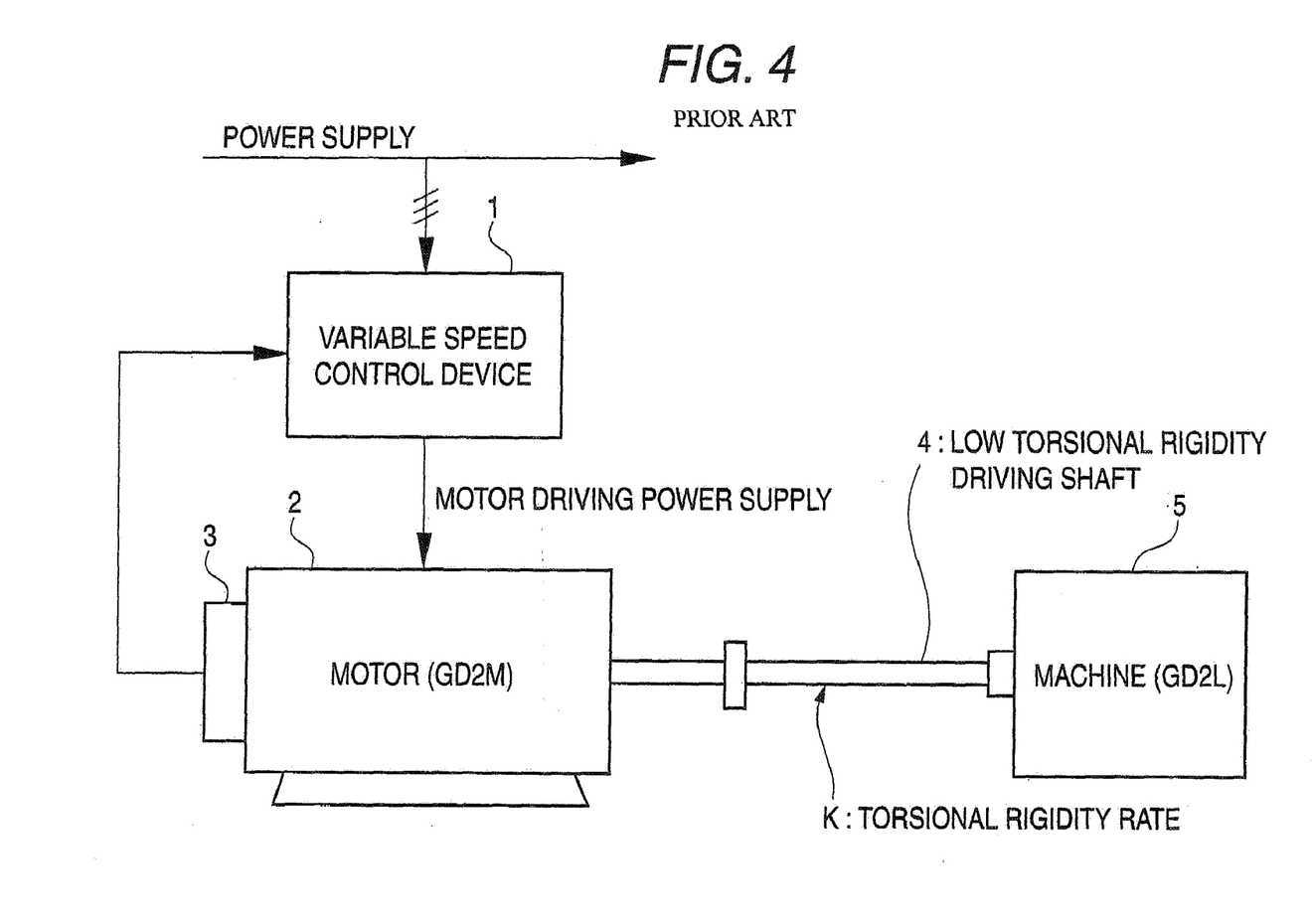
FIG. 4 is a diagram showing the structure of a conventional variable speed driving device.

FIG. 4 is a mechanical diagram showing a general variable speed driving device, and a rotating torque is transmitted to a machine 5 through a driving shaft 4 having a torsional rigidity rate K (Kgm/rad) by means of an electric motor 2. A variable speed control device 1 controls the speed of the electric motor 2 by setting, as a speed feedback signal, a signal detected by a speed detector 3 attached to the electric motor 2.

Figure 5:
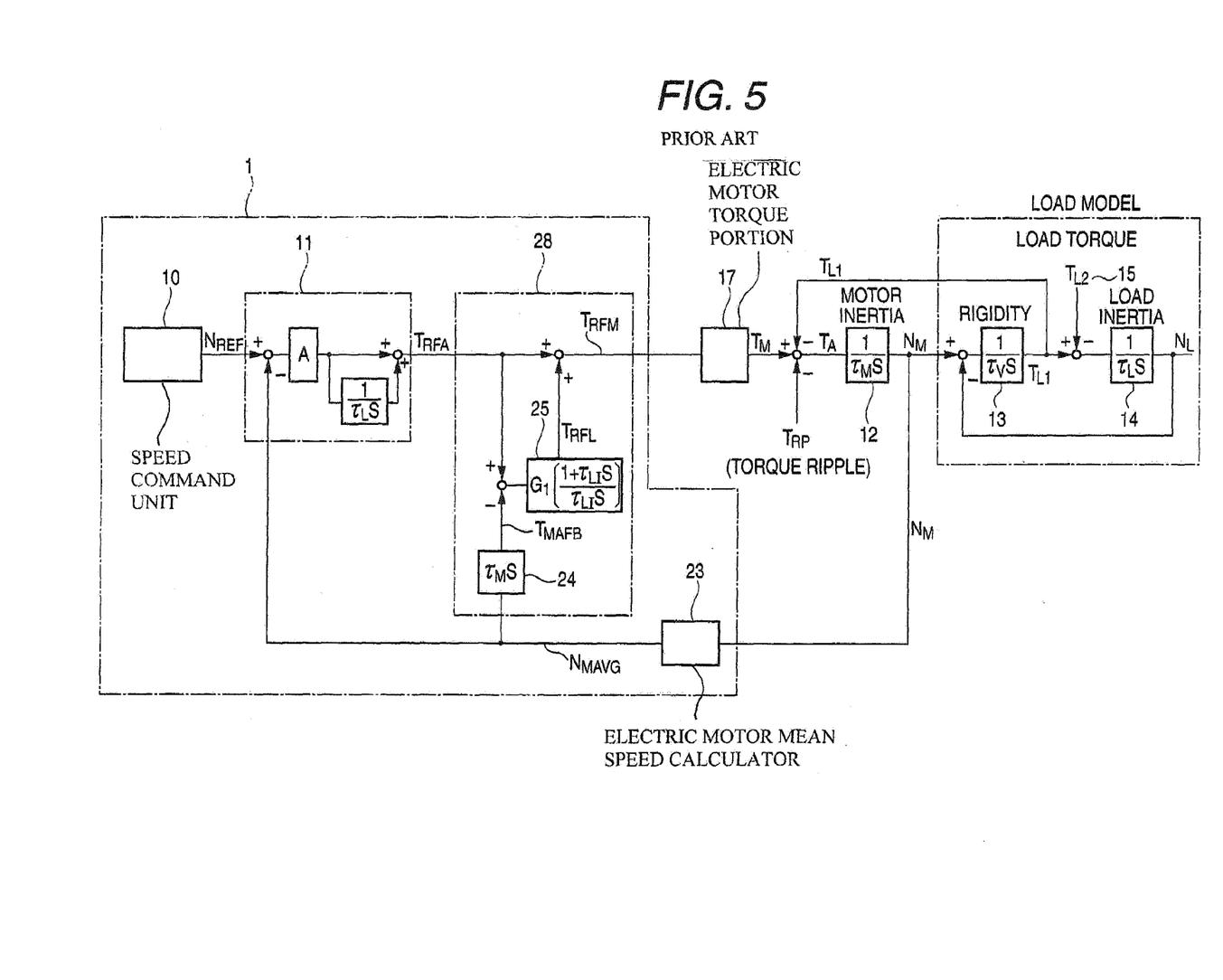
FIG. 5 is a block diagram showing the device illustrated in FIG. 4.

FIG. 5 is a block diagram showing the structure of a speed control device which is constituted by a digital calculating unit or an analog calculating unit as an example of the conventional art. In FIG. 5, a mean value in a constant cycle ts is calculated for the signal of the speed detector 3 (see FIG. 4) attached to the driving shaft of the electric motor by means of a mean speed calculator 23. Referring to a method of calculating a mean speed every constant cycle, if the speed detector is a pulse signal generator, for example, it is possible to obtain a mean speed in the cycle ts of a pulse signal output from the speed detector 3 as the mean frequency of a pulse in ts with a division of a count value in ts by ts. In case of a speed detecting generator of an analog type, the signal of the speed detector can be read at n times in the constant cycle ts and 1/n of the total value of these signals can be set to be the mean speed in ts.

An electric motor mean speed for each constant cycle is indicated as $N_{MAVG}$ and the operation of a speed controller 11 will be first described.

When a speed command $N_{REF}$, the electric motor mean speed $N_{MAVG}$ are input to the speed controller 11 by which a speed deviation signal thereof is obtained, a signal that is obtained by adding a signal, being acquired by multiplying the speed deviation signal by a proportional gain A, and a signal, being acquired by integrating the signal in a time constant $\tau_1$, is output as a torque command signal $T_{RFA}$. In the case in which the speed controller 11 has only the proportional gain A, a signal obtained by multiplying the speed deviation signal by A is output as $T_{RFA}$.

Next, description will be given to the operation of an electric motor acceleration torque calculator 24. When the electric motor mean speed $N_{MAVG}$ for each constant cycle is input to the electric motor acceleration torque calculator 24, a signal $T_{MAFB}$ obtained by multiplying a value acquired by differentiating $N_{MAVG}$ by an inertia time constant $\tau_M$ of an electric motor portion is output. The signal $T_{MAFB}$ becomes an acceleration torque signal of the electric motor.

The operation of an electric motor acceleration torque controller 25 will be described below.

The torque command signal $T_{RFA}$ of the speed controller 11 is set to be the acceleration torque command of the electric motor and the output signal $T_{MAFB}$ of the electric motor acceleration torque calculator 24 is fed back as the acceleration torque signal of the electric motor in response to the command. When a deviation between the two signals is input to the electric motor acceleration torque controller 25, the electric motor acceleration torque controller 25 outputs a signal $T_{RFL}$ obtained by adding a signal acquired by multiplying the signal of the deviation between the two signals by a proportional gain $G_1$ and a signal acquired by integrating the signal in a time constant $\tau_{L1}$ is output to carry out a control in such a manner that the electric motor acceleration torque signal $T_{MAFB}$ is coincident with the torque command signal $T_{RFA}$ of the output of the speed controller 11.

A signal obtained by adding the torque command signal $T_{RFA}$ of the output of the speed controller 11 and the output signal $T_{RFL}$ of the electric motor acceleration torque controller 25 is set to be a torque command $T_{RFM}$ to carry out the torque control of the electric motor. For the load torque $\tau T_{L1}$ to be the disturbance of the acceleration torque of the electric motor, consequently, the control is carried out in a canceling direction through the torque command compensating signal $T_{RFL}$ of the output of the electric motor acceleration torque controller 25. As a result, the electric motor torque command signal acts in such a direction as to cancel the disturbance torque of the electric motor which is generated by the torsion of the driving shaft during an acceleration or the sudden change of a load so that a torsional vibration is suppressed.

[Patent Document 1]
U.S. Pat. No. 3,173,007 Publication (Pages 6 to 7, FIG. 1, FIG. 9)

DISCLOSURE OF THE INVENTION

However, the conventional technique has used a method of estimating disturbance torques such as a pulsating torque of a driving system and a periodic fluctuating torque of a load which are caused by an electric motor or a control device, thereby compensating for the torque of the electric motor to cancel the disturbance torques. In the case in which a periodic fluctuation in the speed or acceleration of a load or a periodic fluctuation in the torque of a driving shaft is feeble, a sufficient suppressing effect cannot be obtained.

For this reason, there is a problem in that a sufficient suppressing effect cannot be obtained in equipment in which the generation of a feeble and periodic fluctuation is not permitted to the speed or acceleration of a load, for example, the acceleration vibration of an elevator cage or a periodic fluctuation in the speed of a print roll of a printing machine.

Therefore, it is an object of the invention to provide a torsional vibration suppressing method and apparatus in an electric motor speed control system which can sufficiently suppress a periodic and feeble fluctuation in the speed or acceleration of a load and a periodic and feeble fluctuation in the torque of a driving shaft.

In order to achieve the object, the invention is directed to a torsional vibration suppressing control method in an electric motor speed control system constituted by a mechanism for transmitting a driving torque from an electric motor to a load through a driving shaft which is provided on the load side of the electric motor and has a low torsional rigidity, and a control device for feeding back an electric motor mean speed $N_{MAVG}$ obtained by a calculation for a mean value every constant cycle for an electric motor speed detection signal detected by a speed detector for a speed command $N_{REF}$ and calculating a deviation signal, and controlling a current of the electric motor in order to have an electric motor torque in accordance with a torque command signal $T_{RFA}$ obtained by amplifying the deviation signal by means of a speed controller having a proportional gain and an integrator or only the proportional gain, wherein a signal obtained by multiplying a signal acquired by differentiating the electric motor mean speed signal $N_{MAVG}$ by an inertia time constant $\tau_M$ of the electric motor portion is input as an electric motor acceleration torque signal $T_{MAFB}$ to an inertia controller with respect to the torque command signal $T_{RFA}$ output from the speed controller, and the inertia controller multiplies the electric motor acceleration torque $T_{MAFB}$ by the proportional gain and then outputs a value thus obtained as an inertia control signal $T_{MJC}$ through a second-order or first-order low-pass filter and a second-order or first-order high-pass filter, feeds back the electric motor acceleration torque signal $T_{MAFB}$ to an electric motor acceleration torque command $T_{RFAX}$ obtained by decreasing the inertia control signal $T_{MJC}$ from the torque command signal $T_{RFA}$ output from the speed controller, and controls a current of the a electric motor in order to have an electric motor torque in accordance with a signal $T_{RFM}$ obtained by adding, to the acceleration torque command $T_{RFAX}$, a torque compensation signal $T_{RFL}$ acquired by amplifying a signal of a deviation thereof by means of an electric motor acceleration torque controller constituted by the proportional gain and the integrator, thereby carrying out a control in order to cancel an electric motor load torque in response to the torque compensation signal $T_{RFL}$ calculated and output in such a manner that the electric motor acceleration torque command $T_{RFAX}$ and the electric motor acceleration torque feedback signal $T_{MFB}$ are coincident with each other and equivalently enlarging and controlling an inertia of the electric motor portion.

Moreover, the invention according to claim 2 is directed to the torsional vibration suppressing method in an electric motor speed control system according to claim 1, wherein a proportional gain of the inertia controller is set to have a negative value of 0 to −1, thereby equivalently reducing and controlling the inertia of the electric motor portion.

Furthermore, the invention according to claim 3 is directed to an electric motor control apparatus constituted by speed detecting means for detecting an electric motor speed, a mechanism for transmitting a driving torque from an electric motor to a load through a driving shaft which is provided on the load side of the electric motor and has a low torsional rigidity, and a control device for feeding back an electric motor mean speed $N_{MAVG}$ obtained by a calculation for a mean value every constant cycle for an electric motor speed detection signal detected by a speed detector for a speed command $N_{REF}$ and calculating a deviation signal, and controlling a current of the electric motor in order to have an electric motor torque in accordance with a torque command signal $T_{RFA}$ obtained by amplifying the deviation signal by speed control means having a proportional gain and an integrator or only the proportional gain, comprising inertia control means for calculating and outputting an inertia control signal $T_{MJC}$ by an inertia controller from an electric motor acceleration torque signal $T_{MAFB}$ obtained by multiplying a signal acquired by differentiating the electric motor mean speed signal $N_{MAVG}$ by an inertia time constant $\tau_M$ of the electric motor portion, electric motor acceleration torque control means having a proportional gain and an integrator for calculating a torque command compensation signal $T_{RFL}$ from a deviation signal of a signal $T_{RFAX}$ obtained by decreasing the electric motor inertia control signal $T_{MJC}$ from the torque command signal $T_{RFA}$ to be an output signal of the speed control means and the electric motor acceleration torque signal $T_{MAFB}$, and electric motor torque control means for controlling a current of the electric motor in order to obtain an electric motor torque in accordance with a torque command $T_{RFM}$ to be a sum of the electric motor acceleration torque command $T_{RFAX}$ and the torque command compensation signal $T_{RFL}$ to be an output signal of the electric motor acceleration torque control means.

Figure 1:
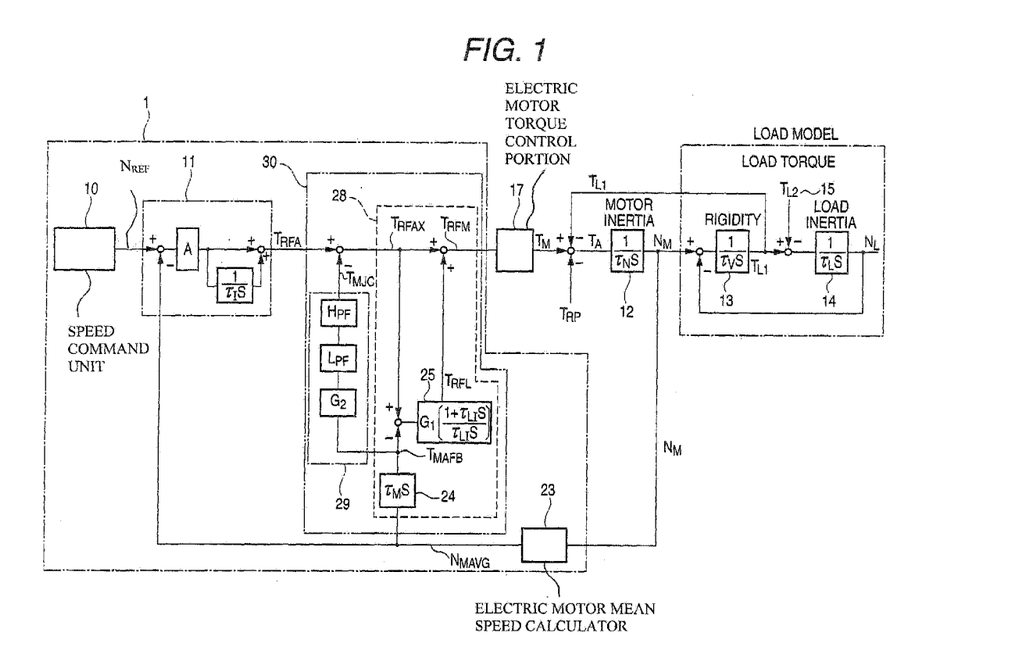
FIG. 1 is a block diagram showing the torsional vibration suppressing device of an electric motor speed control system according to a first embodiment of the invention.

According to the first invention, in a control block of FIG. 5 which has been described in the method according to the Patent Document 1, the signal obtained by multiplying the acceleration torque signal $T_{MAFB}$ of the electric motor acquired as a value obtained by multiplying the value acquired by differentiating the detected speed of the electric motor in the torsional vibration suppressing control portion by the inertia time constant of the electric motor portion by a proportional gain $G_2$ in an inertia controller 29 shown in FIG. 1 according to the invention is output as the inertia control signal $T_{MJC}$ through a band-pass filter constituted by a second-order or first-order high-pass filter $H_{PF}$ and a low-pass filter $L_{PF}$ which causes only the frequency band of the resonant frequency of a driving system to pass therethrough. The torque command signal obtained by decreasing the inertia control signal $T_{MJC}$ from the torque command $T_{RFA}$ to be the output of the speed controller 11 is input to a torsional vibration suppressing control portion 28 according to the conventional art, thereby carrying out a control. According to the invention, in addition to a control function of estimating the pulsating torque and the load torque in the electric motor by the method according to the conventional art and carrying out a compensation to cancel the disturbance torque of the electric motor in response to an estimation signal, therefore, the inertia of the electric motor portion becomes equivalently $(1+G_2)$-fold in respect of a control to act in the resonant frequency band of the driving system so that a torque pulsation having the frequency component of the resonant frequency band, a fluctuation in the speed or acceleration of a load for a fluctuation in a load torque and a fluctuation in a driving torque can be suppressed and controlled to be much smaller than those in the method according to the conventional art.

According to the second invention, moreover, the proportional gain $G_2$ of the inertia controller 29 is set to have a positive value and the inertia of the electric motor portion is enlarged to be equivalently $(1+G_2)$-fold, thereby carrying out the control in the first invention, while the proportional gain $G_2$ of the inertia controller 29 is set to have a negative value of 0 to −1 and is thus used. By controlling the inertia of the electric motor portion corresponding to the magnitude of the inertia which is suitable for a mechanical system, consequently, it is possible to enhance the stability of the control.

Figure 3:
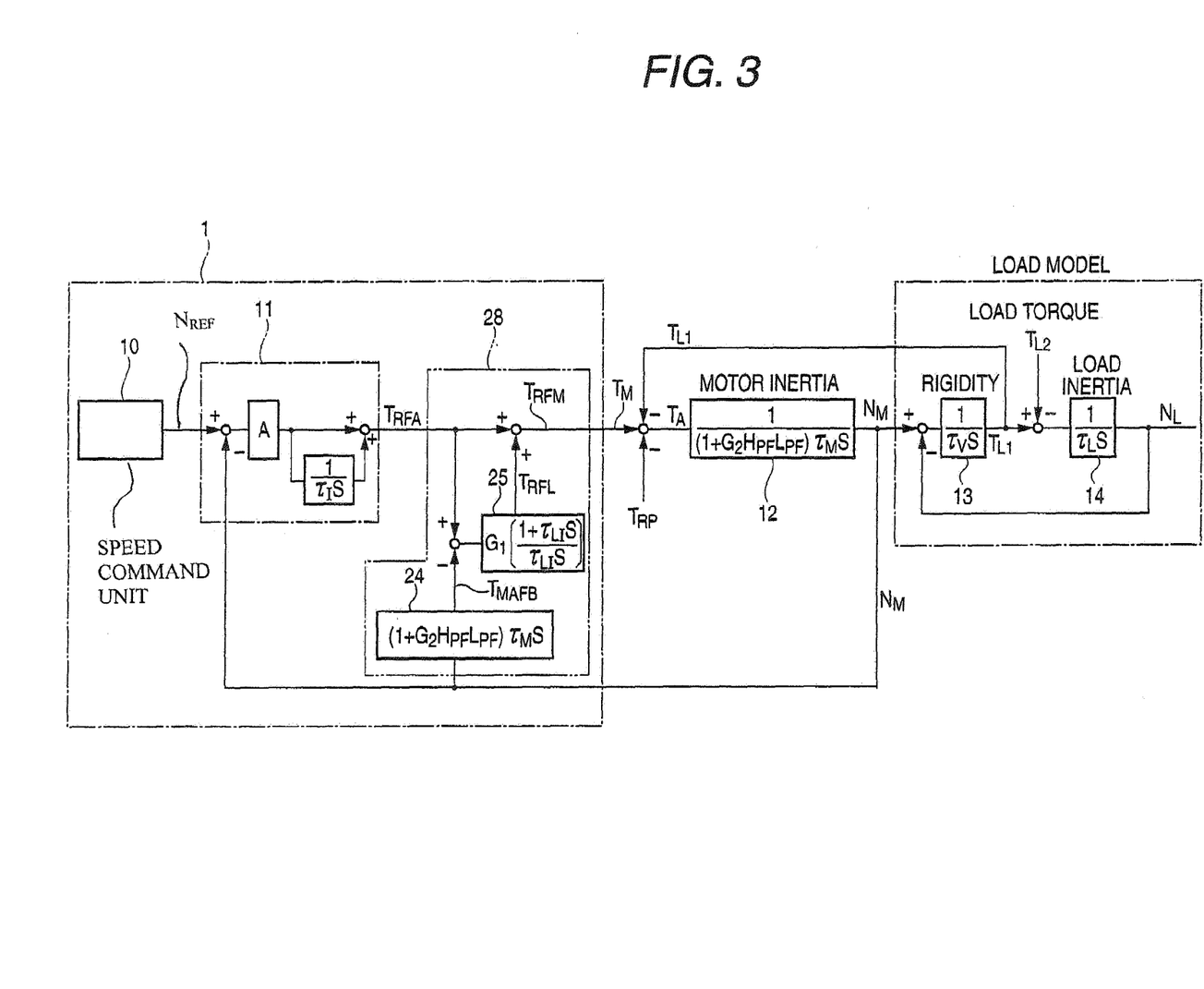
FIG. 3 is a diagram showing the control principle of the control block illustrated in FIG. 2.
Figure 6:
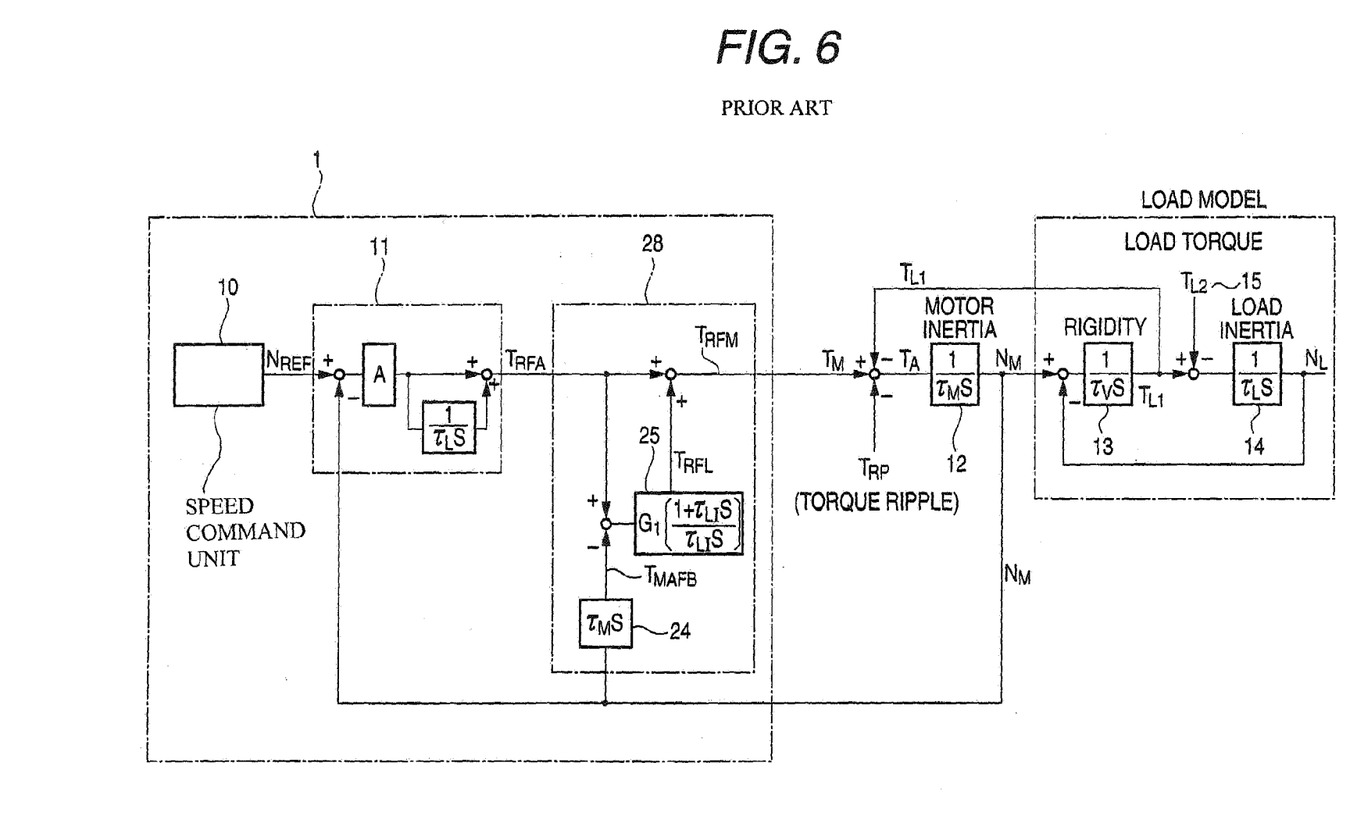
FIG. 6 is a control block diagram showing the control concept of the block illustrated in FIG. 5.

Referring to a principle for equivalently enlarging or reducing and controlling the inertia of the electric motor portion according to the invention, FIG. 6 shows a control block in which a signal delay generated by the mean speed calculator 23 of the electric motor and a control delay of a torque control portion 17 of the electric motor are disregarded and omitted from FIG. 5 illustrating the conventional art for simplicity of description. FIG. 3 is a block diagram in which the inertia time constant $\tau_M$ of the electric motor portion is multiplied by a second-order or first-order low-pass filter function $L_{PF}$, a high-pass filter function $H_{PF}$ and a function $(1+G_2L_{PF}H_{PF})$ constituted by the proportional gain $G_2$ in FIG. 6. FIG. 3 is the block diagram showing that the inertia time constant of the electric motor is $(1+G_2L_{PF}H_{PF})$-fold, that is, approximately $(1+G_2)$-fold for the signal component of the electric motor acceleration torque signal $T_{MAFB}$ in a frequency band passing through the low-pass filter $L_{PF}$ and the high-pass filter $H_{PF}$ with a small attenuation.

Figure 2:
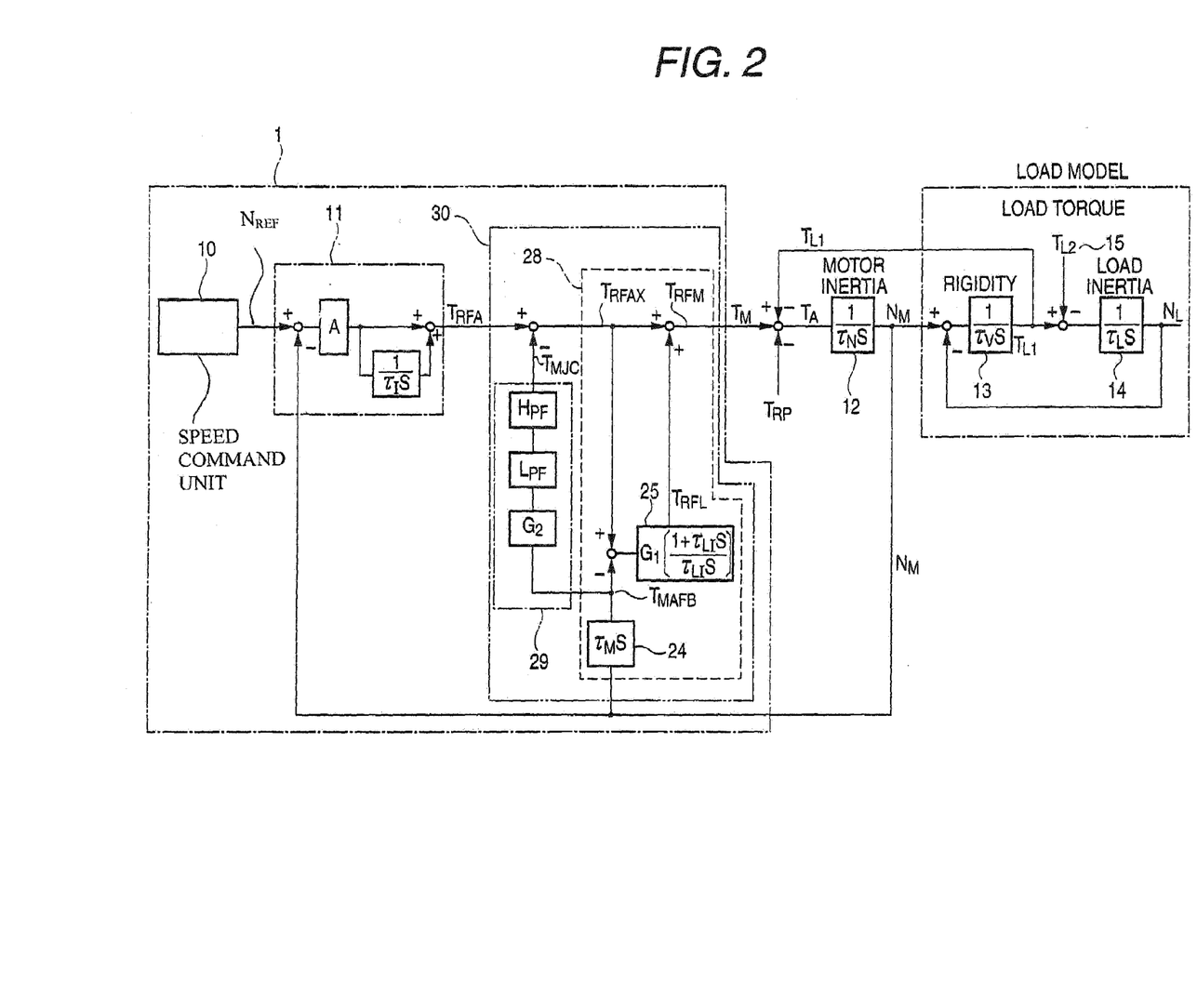
FIG. 2 is a control block diagram showing the control concept of the device illustrated in FIG. 1.

Description will be given to the fact that FIG. 3 and FIG. 2 showing the control method according to the invention are equivalent to each other.

First of all, in the block diagram of FIG. 3, an equation related to an electric motor speed $N_M$ using an electric motor acceleration torque command $T_{RFA}$ output from the speed controller 11, a driving shaft torque $T_{L1}$, and an electric motor pulsating torque $T_{RP}$ is obtained in the following expression.

$$\left\{T_{RFA} + [T_{RFA} - (1 + G_2L_{PF}H_{PF})\tau_M SN_M]G_1\left(\frac{1+\tau_{L1}S}{\tau_{L1}S}\right) - (T_{L1} + T_{RP})\right\} = (1 + G_2L_{PF}H_{PF})\tau_M SN_M \quad (1)$$

When a term including $G_2L_{PF}H_{PF}$ on a right member in the Equation (1) is moved to a left member and is thus arranged, the following equation can be obtained.

$$\left\{T_{RFA} - G_2L_{PF}H_{PF}\tau_M SN_M + [T_{RFA} - (1 + G_2L_{PF}H_{PF})\tau_M SN_M]\right.$$
$$\left. G_1\left(\frac{1+\tau_{L1}S}{\tau_{L1}S}\right) - (T_{L1} + T_{RP})\right\}\left(\frac{1}{\tau_M S}\right) = N_M \quad (2)$$

On the other hand, in the block diagram of FIG. 2 showing the control method according to the invention, an equation related to an electric motor speed $N_M$ is obtained in the following expression in the same manner as in the block diagram of FIG. 3.

$$\left\{T_{RFA} - G_2L_{PF}H_{PF}\tau_M SN_M + [T_{RFA} - (1 + G_2L_{PF}H_{PF})\tau_M SN_M]\right.$$
$$\left. G_1\left(\frac{1+\tau_{L1}S}{\tau_{L1}S}\right) - (T_{L1} + T_{RP})\right\}\left(\frac{1}{\tau_M S}\right) = N_M \quad (3)$$

The equations (2) and (3) are entirely identical to each other. Accordingly, the block of FIG. 2 showing the control method according to the invention and FIG. 3 are equivalent to each other. By applying the invention, accordingly, it is possible to carry out a control in such a manner that the inertia of the electric motor is approximately $(1+G_2)$ times as great as an electric motor pulsating torque having a frequency component in a frequency band passing through the low-pass filter $L_{PF}$ and the high-pass filter $H_{PF}$ with a small attenuation and a load fluctuating torque.

The reference numerals in the drawings are as follows.

1 variable speed control device,
2 electric motor,
3 electric motor speed detector,
4 driving shaft,
5 load machine,
10 speed command unit,
11 speed controller,
12 block representing inertia of electric motor portion,
13 block representing rigidity of driving shaft,
14 block representing inertia of load,
15 block representing load torque,
17 electric motor torque control portion,
23 electric motor mean speed calculator,
24 electric motor acceleration torque calculator,
25 electric motor acceleration torque controller,
28 torsional vibration suppressing control portion,
29 inertia controller,
30 vibration suppressing control portion.

BEST MODE FOR CARRYING OUT THE INVENTION

An embodiment of the invention will be described below with reference to the drawings.

FIG. 1 is a block diagram showing the torsional vibration suppressing device of an electric motor speed control system according to a first embodiment of the invention.

FIG. 2 is a control block diagram showing the control concept of the device illustrated in FIG. 1.

FIG. 3 is a diagram showing the control principle of the control block illustrating the control concept in FIG. 2.

In FIG. 1, 29 denotes an inertia controller which is constituted by a proportional gain $G_2$, a low-pass filter $L_{PF}$ and a high-pass filter $H_{PF}$. A vibration suppressing control portion 30 is constituted by a torsional vibration suppressing control portion 28 and the inertia controller 29.

The same other structures as those in the conventional drawing of FIG. 5 have the same reference numerals and the repetitive description of the structures will be omitted.

Next, an operation will be described.

FIG. 2 is a control block diagram in which the mean speed calculator 23 in the electric motor and the torque control portion 17 are deleted from the torsional vibration suppressing device shown in FIG. 1 so as to be disregarded, and the operation of a speed controller 11 will be first described on the assumption that an electric motor mean speed for each constant cycle calculated by the same calculating method as that in the conventional art is represented as $N_{MAVG}$.

When a speed command $N_{REF}$, the electric motor mean speed $N_{MAVG}$ and a deviation thereof are input to the speed controller 11, a signal obtained by adding a signal acquired by multiplying a speed deviation signal by a proportional gain A and a signal acquired by integrating the signal in a time constant $\tau_1$ is output as a torque command signal $T_{RFA}$. In the case in which the speed controller 11 has only the proportional gain A, a signal obtained by multiplying the speed deviation signal by A is output as $T_{RFA}$.

Referring to the operation of an electric motor acceleration torque calculator 24, when an electric motor mean speed $N_{MAVG}$ for each constant cycle is input to the electric motor acceleration torque calculator 24, a signal $T_{MAFB}$ having a value obtained by multiplying a value acquired by differentiating $N_{MAVG}$ by an inertia time constant $\tau_M$ of an electric motor is output. The signal $T_{MAFB}$ becomes an acceleration torque signal of the electric motor.

Next, the inertia controller 29 outputs, as an inertia control signal $T_{MJC}$, a signal obtained by multiplying the electric motor acceleration torque signal $T_{MAFB}$ to be the output of the electric motor acceleration torque calculator 24 by the proportional gain $G_2$ through the second-order or first-order low-pass filter $L_{PF}$ and the second-order or first-order high-pass filter $H_{PF}$.

A signal obtained by decreasing the inertia control signal $T_{MJC}$ from the output signal $T_{RFA}$ of the speed controller 11 is set to be an electric motor acceleration torque command signal $T_{RFAX}$, and the electric motor acceleration torque command signal $T_{RFAX}$ is input to the torsional vibration suppressing control portion 28 by the method according to the conventional art.

Referring to the operation of an electric motor acceleration torque controller 25, next, the output signal $T_{MAFB}$ of the electric motor acceleration torque calculator 24 is fed back as the acceleration torque signal of the electric motor in response to the electric motor acceleration torque command signal $T_{RFAX}$. When a deviation between the two signals is input to the electric motor acceleration torque controller 25, the electric motor acceleration torque controller 25 outputs a signal $T_{RFL}$ obtained by adding a signal acquired by multiplying the signal of the deviation between the two signals by a proportional gain $G_1$ and a signal acquired by integrating the signal in a time constant $\tau_{L1}$ is output to carry out a control in such a manner that the electric motor acceleration torque signal $T_{MAFB}$ is coincident with the electric motor acceleration torque command $T_{RFAX}$.

A signal obtained by adding the electric motor acceleration torque command $T_{RFAX}$ and the output signal $T_{RFL}$ of the electric motor acceleration torque controller 25 is set to be a torque command $T_{RFM}$ to carry out the torque control of the electric motor. For the load torque $T_{L1}$ to be the disturbance of the acceleration torque of the electric motor, consequently, the control is carried out in a canceling direction through the torque command compensating signal $T_{RFL}$ of the output of the electric motor acceleration torque controller 25, and furthermore, an action is carried out on an electric motor pulsating torque having a frequency component in the vicinity of a resonant frequency or the fluctuating torque of a load in such a manner that the inertia of the electric motor portion is equivalently enlarged to be approximately $(1+G_2)$-fold by the proportional gain $G_2$ in respect of a control, and the influence of the electric motor pulsating torque to be an exciting source or the periodic fluctuating torque of the load is relieved and a change in the speed or acceleration of the load and the torque fluctuation of a driving shaft can be suppressed. Referring to a principle for equivalently enlarging the inertia of the electric motor to be $(1+G_2)$-fold, as described above, the block of FIG. 3 obtained by multiplying the inertia time constant $\tau_M$ of the electric motor portion by the function $(1+G_2L_{PF}H_{PF})$ constituted by $L_{PF}$, $H_{PF}$ and the proportional gain $G_2$ in FIG. 6 showing the conventional art and the block of FIG. 2 are equivalent to each other, and the inertia of the electric motor can be controlled to be approximately $(1+G_2)$-fold as shown in FIG. 2 in the invention.

Next, a second embodiment of the invention will be described with reference to the drawings.

In each of the drawings, the first embodiment is common to the second embodiment, and a control structure according to the second embodiment is entirely identical to that in FIG. 1.

As described above, in the block shown in FIG. 3, the equation related to the electric motor speed $N_M$ can be represented as the Equation (2). On the other hand, the equation related to the electric motor speed $N_M$ in the block of FIG. 2 can be represented as the Equation (3). The Equations (2) and (3) are entirely identical to each other. Therefore, the block provided with the inertia controller 29 according to the invention shown in FIG. 1 can be controlled in such a manner that the inertia of the electric motor is approximately $(1+G_2)$-fold.

By this principle, the proportional gain G2 of the inertia controller 29 is set to have a positive value to equivalently enlarge the inertia of the electric motor portion to be approximately $(1+G_2)$-fold and to thus carry out a control in the first embodiment. On the other hand, in the second embodiment, the proportional gain $G_2$ Of the inertia controller 29 is set to have a negative value of 0 to −1 and is thus used. Consequently, the inertia of the electric motor portion is equivalently reduced to be approximately $(1+G_2)$-fold and is thus controlled so that the inertia of the electric motor portion is controlled corresponding to the magnitude of the inertia which is suitable for a mechanical system.

As described above, according to the first invention, the inertia control means for equivalently increasing the inertia of the electric motor according to the invention to carry out a control is added to the control method in the Patent Document 1 according to the conventional art. Consequently, it is possible to maintain an advantage that a control is carried out to estimate and cancel the disturbance torque of an electric motor according to the conventional art, and furthermore, to add such an advantage as to equivalently increase and control the inertia of the electric motor, thereby obtaining an advantage that a feeble fluctuation in the speed or acceleration of a load which is generated by the pulsating torque of the electric motor or the periodic torque fluctuation of the load and a feeble fluctuation in the driving shaft torque can be suppressed more greatly than that in the control method according to the conventional art.

According to the second invention, moreover, the proportional gain G2 of the inertia controller is set to have the negative value of 0 to −1 and is thus used. Consequently, it is possible to obtain such an advantage as to enhance the stability of a control by equivalently reducing the inertia of the electric motor portion to be approximately $(1+G_2)$-fold to carry out a control, thereby controlling the inertia of the electric motor portion corresponding to the magnitude of the inertia which is suitable for a mechanical system.

While the invention has been described in detail with reference to the specific embodiments, it is apparent to the skilled in the art that various changes and modifications can be made without departing from the spirit and scope of the invention.

The application is based on Japanese Patent Application (2002-349879) filed on Dec. 2, 2002, and contents thereof are incorporated herein by reference.

INDUSTRIAL APPLICABILITY

According to the invention, thus, the range of a control can be expanded and a vibration suppressing effect can be enhanced. For equipment in which the generation of a feeble and periodic fluctuation is not permitted to the speed or acceleration of a load, for example, a feeble fluctuation such as the acceleration vibration of an elevator cage or the periodic speed fluctuation of the print roll of a printing machine, similarly, it is possible to obtain a sufficient suppressing effect.

The invention claimed is:

1. A torsional vibration suppressing control method in an electric motor speed control system constituted by a mechanism for transmitting a driving torque from an electric motor to a load through a driving shaft which is provided on the load side of the electric motor and has a low torsional rigidity, and a control device for feeding back an electric motor mean speed $N_{MAVG}$ obtained by a calculation for a mean value every constant cycle for an electric motor speed detection signal detected by a speed detector for a speed command $N_{REF}$ and calculating a deviation signal, and controlling a current of the electric motor in order to have an electric motor torque in accordance with a torque command signal $T_{RFA}$ obtained by amplifying the deviation signal by means of a speed controller having a proportional gain and an integrator or only the proportional gain, wherein a signal obtained by multiplying a signal acquired by differentiating the electric motor mean speed signal $N_{MAVG}$ by an inertia time constant $\tau_M$ of the electric motor portion is input as an electric motor acceleration torque signal $T_{MAFB}$ to an inertia controller with respect to the torque command signal $T_{RFA}$ output from the speed controller, and the inertia controller multiplies the electric motor acceleration torque $T_{MAFB}$ by the proportional gain and then outputs a value thus obtained as an inertia control signal $T_{MJC}$ through a second-order or first-order low-pass filter and a second-order or first-order high-pass filter, feeds back the electric motor acceleration torque signal $T_{MAFB}$ to an electric motor acceleration torque command $T_{RFAX}$ obtained by decreasing the inertia control signal $T_{MJC}$ from the torque command signal $T_{RFA}$ output from the speed controller, and controls a current of the electric motor in order to have an electric motor torque in accordance with a signal $T_{RFM}$ obtained by adding, to the acceleration torque command $T_{RFAX}$, a torque compensation signal $T_{RFL}$ acquired by amplifying a signal of a deviation thereof by means of an electric motor acceleration torque controller constituted by the proportional gain and the integrator, thereby carrying out a control in order to cancel an electric motor load torque in response to the torque compensation signal $T_{RFL}$ calculated and output in such a manner that the electric motor acceleration torque command $T_{RFAX}$ and the electric motor acceleration torque feedback signal $T_{MAFB}$ are coincident with each other and equivalently enlarging and controlling an inertia of the electric motor portion.

2. The torsional vibration suppressing method in an electric motor speed control system according to claim 1, wherein a proportional gain of the inertia controller is set to have a negative value of 0 to −1, thereby equivalently reducing and controlling the inertia of the electric motor portion.

3. An electric motor control apparatus constituted by speed detecting means for detecting an electric motor speed, a mechanism for transmitting a driving torque from an electric motor to a load through a driving shaft which is provided on the load side of the electric motor and has a low torsional rigidity, and a control device for feeding back an electric motor mean speed $N_{MAVG}$ obtained by a calculation for a mean value every constant cycle for an electric motor speed detection signal detected by a speed detector for a speed command $N_{REF}$ and calculating a deviation signal, and controlling a current of the electric motor in order to have an electric motor torque in accordance with a torque command signal $T_{RFA}$ obtained by amplifying the deviation signal by speed control means having a proportional gain and an integrator or only the proportional gain, comprising:

inertia control means for calculating and outputting an inertia control signal $T_{MJC}$ by an inertia controller from an electric motor acceleration torque signal $T_{MAFB}$ obtained by multiplying a signal acquired by differentiating the electric motor mean speed signal $N_{MAVG}$ by an inertia time constant $\tau_M$ of the electric motor portion;

electric motor acceleration torque control means having a proportional gain and an integrator for calculating a torque command compensation signal $T_{RFL}$ from a deviation signal of a signal $T_{RFAX}$ obtained by decreasing the electric motor inertia control signal $T_{MJC}$ from the torque command signal $T_{RFA}$ to be an output signal of the speed control means and the electric motor acceleration torque signal $T_{MAFB}$; and electric motor torque control means for controlling a current of the electric motor in order to obtain an electric motor torque in accordance with a torque command $T_{RFM}$ to be a sum of the electric motor acceleration torque command $T_{RFAX}$ and the torque command compensation signal $T_{RFL}$ to be an output signal of the electric motor acceleration torque control means.

* * * * *